United States Patent
Trefzer et al.

(10) Patent No.: US 6,862,513 B2
(45) Date of Patent: Mar. 1, 2005

(54) RAPID CAPTURE OF A SLIPPING HIGH-MU WHEEL DURING A SETPOINT SPEED REGULATION OPERATION

(75) Inventors: Mirko Trefzer, Ettlingen (DE); Rainer Heinsohn, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/402,524

(22) Filed: Mar. 28, 2003

(65) Prior Publication Data

US 2003/0216851 A1 Nov. 20, 2003

(30) Foreign Application Priority Data

Mar. 28, 2002 (DE) .......................................... 102 13 893
Aug. 21, 2002 (DE) .......................................... 102 38 225

(51) Int. Cl.$^7$ ................................................. G06F 7/00
(52) U.S. Cl. ........................................................ 701/80
(58) Field of Search ................................. 701/70–74, 80

(56) References Cited

U.S. PATENT DOCUMENTS 5,275,474 A   1/1994   Chin et al.
5,511,862 A * 4/1996   Fujioka .................... 303/113.4

FOREIGN PATENT DOCUMENTS

EP              794081             9/1997

* cited by examiner

*Primary Examiner*—Yonel Beaulieu
(74) *Attorney, Agent, or Firm*—Kenyon & Kenyon

(57) ABSTRACT

A method and an apparatus for regulating the speed of the low-$\mu$ wheel as a vehicle starts from rest or accelerates on a road surface having adhesive friction values that differ between the left and right sides of the vehicle (split-$\mu$), the low-$\mu$ wheel being braked by braking intervention when it has exceeded a defined slip threshold. In order to improve the acceleration behavior of the vehicle, it is proposed to regulate the speed of the slipping low-$\mu$ wheel to a defined setpoint speed during a setpoint speed regulation phase in which the setpoint pressure for the brake of the low-$\mu$ wheel is set so that the wheel tracks the setpoint speed; to discontinue setpoint speed regulation when the high-$\mu$ wheel meets a defined breakaway condition; to initiate a setpoint pressure control operation during a setpoint pressure control phase in which the setpoint pressure of the low-$\mu$ wheel is abruptly reduced in order to decrease the drive torque transferred to the high-$\mu$ wheel; and lastly to continue setpoint speed regulation.

16 Claims, 2 Drawing Sheets

RAPID CAPTURE OF A SLIPPING HIGH-MU WHEEL DURING A SETPOINT SPEED REGULATION OPERATION

FIELD OF THE INVENTION

The present invention relates to a method and an apparatus for regulating the speed of the low-$\mu$ wheel as a vehicle starts from rest or accelerates on a road surface having adhesive friction values that differ between the left and right sides of the vehicle (split-$\mu$).

BACKGROUND INFORMATION

As a vehicle starts from rest and accelerates on a split-$\mu$ surface, a drive slip control system usually intervenes in operation of the vehicle in such a way that when a defined slip threshold is exceeded the wheel located on the slick side of the road surface (low-$\mu$ wheel) is braked by braking intervention, and optionally the engine torque is reduced.

In the braking intervention, the braking torque exerted by the brake of the low-$\mu$ wheel is transferred via the differential to the other wheel that is not yet slipping. This transferred drive torque can in turn cause the wheel that is not yet slipping (high-$\mu$ wheel) also to be begin slipping; as a result, the stability and in particular lateral stability of the vehicle, as well as traction at the wheel which is still adhering, are lost, and critical driving situations can occur.

To prevent detachment of the high-$\mu$ wheel on a preventive basis, in previously known drive slip control systems the braking pressure at the low-$\mu$ wheel, and thus the drive torque at the high-$\mu$ wheel, are modified (modulated) only very carefully. The acceleration behavior of the vehicle thereby suffers, especially when starting from rest and accelerating on slopes.

If slippage of the high-$\mu$ wheel nevertheless occurs, existing drive slip control systems are not capable of intercepting the breakaway of the high-$\mu$ wheel sufficiently quickly, and rapidly re-establishing vehicle stability.

SUMMARY OF THE INVENTION

It is therefore an object of the present invention to create a method and a regulation apparatus with which the acceleration behavior of the vehicle under split-$\mu$ conditions can be improved, the intention being to ensure vehicle stability and controllability even when the high-$\mu$ wheel is breaking away.

The idea of the present invention is to regulate the speed of a slipping low-$\mu$ wheel to a defined speed during a setpoint speed regulation phase in which the setpoint pressure for the brake is set so that the wheel tracks the setpoint speed; to discontinue setpoint speed regulation when the high-$\mu$ wheel meets a defined breakaway condition; and then to perform a setpoint pressure control operation in which the setpoint pressure of the low-$\mu$ wheel is abruptly reduced in order to decrease the locking torque transferred to the high-$\mu$ wheel; and lastly to continue setpoint speed regulation. The abrupt reduction in setpoint pressure at the low-$\mu$ wheel results in a sudden load relief on the high-$\mu$ wheel, which is therefore rapidly recaptured.

According to a preferred embodiment of the present invention, the setpoint pressure is lowered by way of the setback of at least 10 bar, preferably at least 15 bar, and in particular 20 bar. As a result of this direct and rapidly controlling action on the setpoint pressure of the low-$\mu$ wheel, the load on the high-$\mu$ wheel that has begun to slip is abruptly relieved, and it is rapidly recaptured.

In order to improve the dynamic behavior of a hydraulic positioner (for setting the braking pressure), a suitable filter (preferably a dt filter) positioned after a control unit is used. For example, if the control unit defines a setback of 10 bar, this is first amplified to, for example, 20 bar in order then to approach, e.g. in accordance with an e-function, the setpoint pressure outputted by the control unit.

After capture of the high-$\mu$ wheel, setpoint speed regulation is continued, an initial setpoint speed value preferably being set that is higher than the setpoint speed value at the end of the first setpoint speed regulation phase.

The initial setpoint speed value is preferably at least 1 m/s, and in particular at least 2 m/s, higher than the setpoint speed value at the end of the first setpoint speed regulation phase. As a result, the system deviation between the wheel speed of the low-$\mu$ wheel and the setpoint speed after the abrupt load relief does not become too great, and excessive braking pressure is not exerted on the brake of the low-$\mu$ wheel. This prevents the high-$\mu$ wheel from immediately starting to slip again.

The magnitude of the setpoint pressure setback can be set as a function of the wheel speed and/or the wheel acceleration of the high-$\mu$ wheel, the setback preferably becoming greater as the speed or the acceleration of the wheel increases.

According to a preferred embodiment of the present invention, in the first and/or second setpoint speed regulation phase, a setpoint speed profile in the form of a straight line of negative slope is defined.

The setpoint speed profile in the second setpoint speed regulation phase preferably has a lesser slope than the setpoint speed profile prior to the setpoint pressure control phase. In the second setpoint speed regulation phase, the setpoint speed for the brake of the low-$\mu$ wheel will therefore assume a lower value than in the first setpoint speed regulation phase. As a result, less locking torque is transferred to the high-$\mu$ wheel, which therefore exhibits less of a tendency to slip.

A breakaway condition for the high-$\mu$ wheel, beyond which the controlling intervention is performed on the setpoint pressure of the low-$\mu$ wheel, can be defined, for example, by exceedance of a slip threshold, a speed threshold, or an acceleration threshold, optionally with additional expiration of a time threshold. Breakaway of the high-$\mu$ wheel is detected, for example, when the wheel acceleration of the high-$\mu$ wheel lies above a defined threshold and, for example, a defined time period has been exceeded, or when the slippage of the high-$\mu$ wheel lies above a defined threshold and a positive acceleration of the high-$\mu$ wheel is simultaneously ascertained.

DETAILED DESCRIPTION

Figure 1:
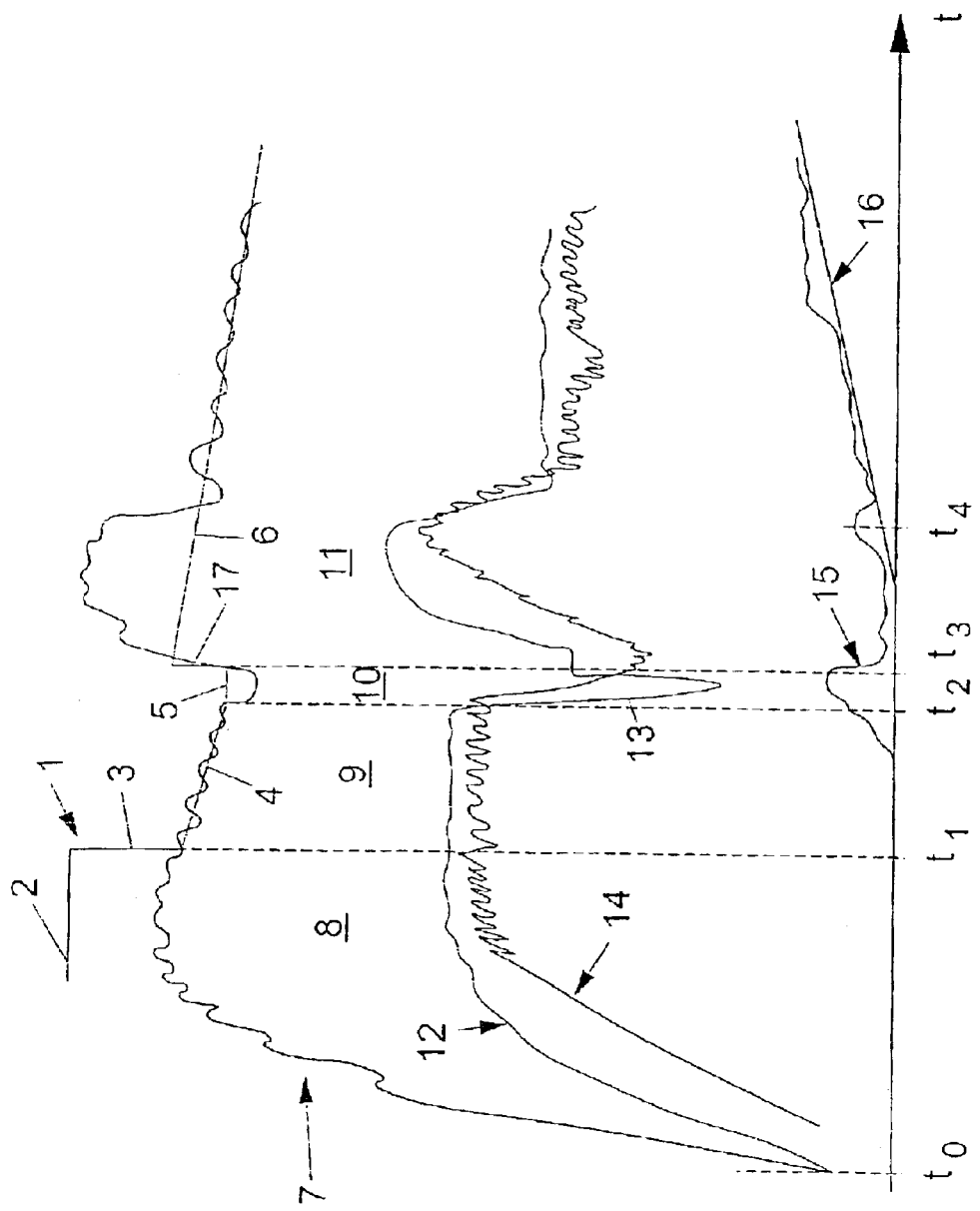
FIG. 1 shows a variety of speed and pressure profiles during an ASR regulation operation.

FIG. 1 shows a variety of speed and pressure profiles during a setpoint speed regulation operation on a low-$\mu$ wheel. The depiction represents the regulation profile in a driving situation in which a vehicle is starting from rest or accelerating on a road surface having different adhesion friction values between the left and right sides of the vehicle (split-$\mu$ situation), and the low-$\mu$ wheel (curve 7) is braked by way of a braking intervention when it exceeds a defined slip threshold.

The setpoint pressure at the low-$\mu$ wheel is labeled 12, and the actual pressure 14.

FIG. 1 shows, at time t0, the initial steeply rising speed profile 7 of a low-$\mu$ wheel that is slipping. Once a defined slip threshold has been exceeded, setpoint braking pressure 12 of the brake of the low-$\mu$ wheel is increased in order to brake the low-$\mu$ wheel and transfer a drive torque to the high-$\mu$ wheel which is still adhering. The control action in this first control phase 8 is preferably a pure p-type control, implemented by way of a p-controller. As is evident, actual pressure 14 acting on the brake of the low-$\mu$ wheel tracks setpoint pressure 12 with a time delay.

The low-$\mu$ wheel is braked by the increasing actual pressure 14, so that speed 7 reverses after reaching a peak value.

At time t1, a setpoint speed regulation action then begins, defining a setpoint speed 1 to which wheel speed 1 is regulated. What is usually used for this purpose is a PID controller which sets setpoint pressure 12 for the brake of the low-$\mu$ wheel in such a way that the wheel tracks setpoint speed 1.

The associated ASR control system encompasses a controller, in particular a PID controller, that regulates wheel speed 7 of the low-$\mu$ wheel to a defined setpoint speed 1 during a first and second setpoint speed regulation phase 9, 11. In setpoint speed regulation phases 9, 11, setpoint pressure 12 for the brake of the low-$\mu$ wheel is set so that the wheel substantially tracks setpoint speed 1.

The manipulated variable here is setpoint pressure 12 of the low-$\mu$ wheel, and the actuator preferably a continuously controllable valve with which the braking pressure acting on the brake of the low-$\mu$ wheel can be continuously regulated.

As is evident, at time t1 the setpoint speed 1 jumps from a passive value 2 to a value that corresponds substantially to the present wheel speed, and then follows a straight line 4 of negative slope in order to slowly brake the slipping low-$\mu$ wheel. In the meantime, setpoint pressure 12 moves to a relatively high value.

Shortly before time t2, the high-$\mu$ wheel also begins to slip, as is evident from speed profile 15 of the high-$\mu$ wheel. At time t2, the slipping high-$\mu$ wheel meets a breakaway condition and thereby initiates a setpoint pressure control phase 10 in which setpoint pressure 12 of the low-$\mu$ wheel is abruptly (see segment 13 of setpoint pressure profile 12) reduced by at least 10 bar, preferably approximately 20 bar, in order to relieve load on the low-$\mu$ wheel and decrease the locking torque transferred to the high-$\mu$ wheel.

In the present case, the breakaway condition is met when the wheel acceleration of the high-$\mu$ wheel is greater than a defined threshold, and when that condition persists for a defined time.

Setback 13 that is defined by the control system (e.g. 10 bar) is amplified (e.g. to 20 bar) preferably by way of a suitable filter, e.g. a dt filter. Setpoint pressure 12 is then, for example with PT1 delay, restored to the actual setback value (10 bar) of the control system, which is reached approximately at time t3. Setpoint speed 1 is held constant during the setpoint pressure control phase (cf. reference character 5).

As is evident from speed profile 15 of the high-$\mu$ wheel, the high-$\mu$ wheel is caught as a result of the sudden pressure decrease 13, and its slip declines again relatively quickly. The low-$\mu$ wheel, on the other hand, accelerates because of the sudden pressure decrease 13 (cf. speed profile 7 after time t3), and therefore needs to be regulated again.

The second setpoint speed regulation phase 11 begins after capture of the high-$\mu$ wheel has been detected, for example because the slip, speed, or acceleration has fallen below a threshold, optionally with the additional expiration of a time threshold.

The setpoint speed regulation action begins with an initial value that is higher, by a value equal to a defined offset 17, than the setpoint speed value at the end of first setpoint speed regulation phase 9. In the present example, offset 17 is 1 m/s, and serves to keep the system deviation between wheel speed 7 and setpoint speed 1 from becoming excessive.

During second setpoint speed regulation phase 11, once again a setpoint speed 1 is defined, in the form of a line 6 of negative slope, to which the low-$\mu$ wheel is regulated. Here again, a PID controller is usually used. The slope of line 6, however, is less than that of line 4 in first setpoint speed regulation phase 9. As a result, the controller sets a lower setpoint pressure 12 than in first setpoint speed regulation phase 9. The drive torque transferred to the high-$\mu$ wheel is thus also less, so that the latter exhibits less of a tendency to slip.

At time t4 the high-$\mu$ wheel once again begins to slip, but in this case does not meet the breakaway condition.

As is evident from vehicle speed profile 16, the vehicle then slowly begins to move.

The proposed setpoint speed regulation operation with intervening setpoint pressure control has the substantial advantage that wheel pressure 14 in the low-$\mu$ wheel can be modulated relatively quickly, so that any breakaway of the high-$\mu$ wheel can be controlled out very quickly. The acceleration behavior of the vehicle is thus substantially improved.

Figure 2:
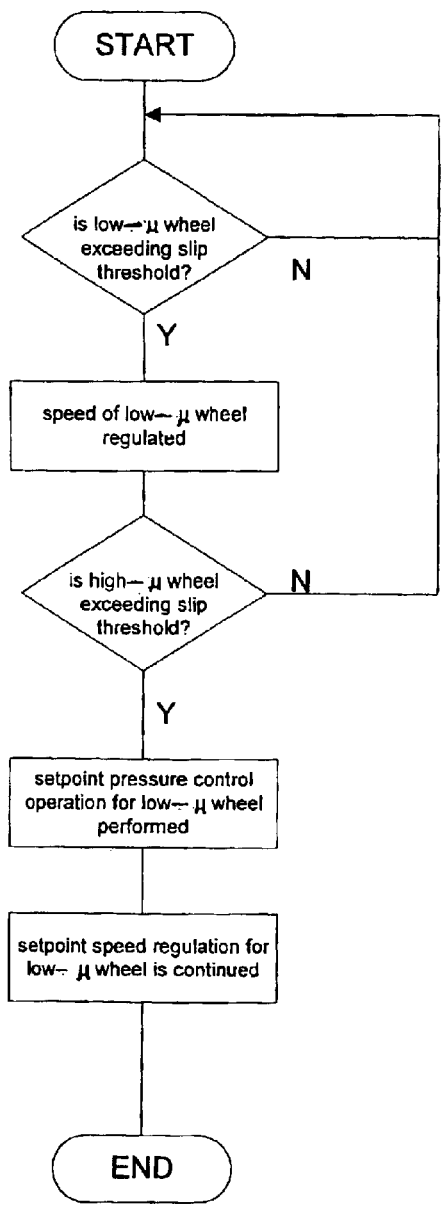
FIG. 2 is a flow chart to explain a setpoint speed regulation action according to an embodiment of the present invention.

FIG. 2 shows execution of the method in the context of a setpoint speed regulation operation with intervening setpoint pressure control, in the form of a flow chart. Step 20 firstly checks whether the low$\mu$ wheel is exceeding a defined slip threshold sw. If Yes, speed 7 of the slipping low-$\mu$ wheel is regulated, during setpoint speed regulation phase 9, to a defined setpoint speed 1 (cf. FIG. 1).

In step 22 the slippage of the high-$\mu$ wheel is monitored, and in step 23 the setpoint speed regulation operation is discontinued if the wheel slip of the high-$\mu$ wheel exceeds a defined threshold value. A setpoint pressure control operation is then performed, in which setpoint pressure 12 of the low-$\mu$ wheel is abruptly reduced in order to decrease the locking torque transferred to the high-$\mu$ wheel. Lastly, in step 24 setpoint speed regulation is continued, the initial setpoint speed value at the onset of second setpoint speed regulation phase 11 being higher than the setpoint speed value at the end of first setpoint speed regulation phase 9.

Figure 3:
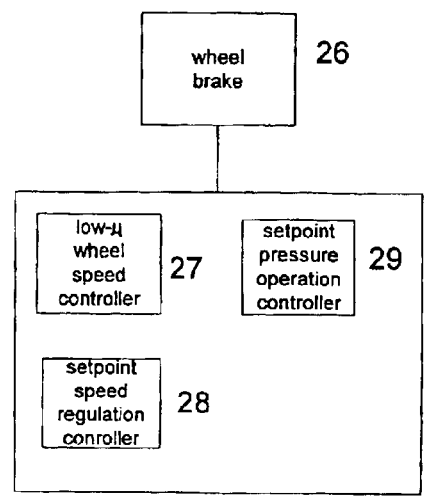
FIG. 3 shows an ASR system that is set up for carrying out the method of FIG. 2.

FIG. 3 shows a TCS system that is set up for carrying out the method described above. The TCS system encompasses a regulation and control unit 25 having a controller 27 for regulating the speed of the low-$\mu$ wheel during first setpoint speed regulation phase 9, element 28 for performing a setpoint pressure control operation during setpoint pressure control phase 10, and a controller 29 for performing a setpoint speed regulation operation during second setpoint speed regulation phase 11.

Regulation and control unit 25 coacts with a wheel brake 26 in order to set the defined wheel slip at the low-$\mu$ wheel.

The wheel slip is determined from the speed v of the driven wheels.

| List of reference characters | |
|---|---|
| 1 | Setpoint speed |
| 2 | Passive value |
| 3 | Setback |
| 4 | Line |
| 5 | Flat segment |
| 6 | Line |
| 7 | Wheel speed |
| 8 | P-control phase |
| 9 | Setpoint speed regulation phase |
| 10 | Setpoint pressure control phase |
| 11 | Second setpoint speed regulation phase |
| 12 | Setpoint pressure |
| 13 | Setpoint pressure reduction |
| 14 | Actual pressure |
| 15 | Speed of high-$\mu$ wheel |
| 16 | Vehicle speed |
| 17 | Offset |
| 20–24 | Method steps |
| 25 | Regulation and control unit |
| 26 | Wheel brake |
| 27 | Controller |
| 28 | Setpoint pressure control device |
| 29 | Controller |
| t0–t4 | Time values |
| v | Wheel speed |

What is claimed is:

1. A method for regulating a speed of a low-$\mu$ wheel as a vehicle one of starts from rest and accelerates on a road surface having adhesive friction values that differ between a left side of the vehicle and a right side of the vehicle, comprising:

braking the low-$\mu$ wheel by a braking intervention when the low-$\mu$ wheel exceeds a defined slip threshold, thereby becoming a slipping low-$\mu$ wheel;

regulating the speed of the slipping low-$\mu$ wheel to a defined setpoint speed according to a setpoint speed regulation during a first setpoint speed regulation phase in which a setpoint pressure for the braking of the low-$\mu$ wheel is set so that the low-$\mu$ wheel tracks the setpoint speed;

discontinuing the setpoint speed regulation when a high-$\mu$ wheel meets a defined breakaway condition;

performing a setpoint pressure control operation during a setpoint pressure control phase in which the setpoint pressure of the low-$\mu$ wheel is abruptly reduced in order to decrease a drive torque transferred to the high-$\mu$ wheel; and continuing the setpoint speed regulation in a second setpoint speed regulation phase.

2. The method as recited in claim 1, further comprising: performing a setback in the setpoint pressure of at least 10 bar.

3. The method as recited in claim 1, further comprising: performing a setback in the setpoint pressure of at least 15 bar.

4. The method as recited in claim 1, further comprising: defining a setback by a control system; and amplifying the setback by a dt filter.

5. The method as recited in claim 1, wherein: an initial value of the setpoint speed at an onset of the second setpoint speed regulation phase is higher than a value of the setpoint speed at an end of the first setpoint speed regulation phase.

6. The method as recited in claim 5, wherein: the initial value of the setpoint speed is at least 1 m/s higher than the value of the setpoint speed at the end of the first setpoint speed regulation phase.

7. The method as recited in claim 5, wherein: the initial value of the setpoint speed is at least 2 m/s higher than the value of the setpoint speed at the end of the first setpoint speed regulation phase.

8. The method as recited in claim 1, wherein: a magnitude of a setpoint pressure setback is accomplished as a function of one of a wheel speed and a wheel acceleration of the high-$\mu$ wheel.

9. The method as recited in claim 1, further comprising: during the first setpoint speed regulation phase and the second setpoint speed regulation phase, defining a setpoint speed profile as a straight line of a negative slope.

10. The method as recited in claim 9, wherein: the setpoint speed profile in the second setpoint speed regulation phase has a lesser slope than that in the first setpoint speed regulation phase.

11. The method as recited in claim 1, further comprising: after a breakaway of the low-$\mu$ wheel, performing a p-control operation on a wheel speed of the low-$\mu$ wheel during a first regulation phase.

12. An apparatus for regulating a speed of a low-$\mu$ wheel as a vehicle one of starts from rest and accelerates on a road surface having adhesive friction values that differ between a left side of the vehicle and a right side of the vehicle, comprising:

an arrangement for braking the low-$\mu$ wheel by a braking intervention when the low-$\mu$ wheel exceeds a defined slip threshold, thereby becoming a slipping low-$\mu$ wheel;

a controller for regulating the speed of the slipping low-$\mu$ wheel to a defined setpoint speed according to a setpoint speed regulation during a first setpoint speed regulation phase in which a setpoint pressure for the braking of the low-$\mu$ wheel is set so that the low-$\mu$ wheel tracks the setpoint speed;

an arrangement for performing a setpoint pressure control operation during a setpoint pressure control phase in which the setpoint pressure of the low-$\mu$ wheel is abruptly reduced in order to decrease a drive torque transferred to a high-$\mu$ wheel; and a controller for performing the setpoint speed regulation in a second setpoint speed regulation phase.

13. The apparatus as recited in claim 12, wherein: the controller for performing the setpoint speed regulation defines at a beginning of the second setpoint speed regulation phase an initial value of the setpoint speed that is higher than a value of the setpoint speed at an end of the first setpoint speed regulation phase.

14. The apparatus as recited in claim 12, wherein: the arrangement for performing the setpoint pressure control operation includes a dt filter.

15. The apparatus as recited in claim 12, wherein: the controller for performing the setpoint speed regulation operation includes a PID controller.

16. The apparatus as recited in claim 12, further comprising: a continuously controllable valve as an actuator.

* * * * *